June 3, 1952  N. H. FRANKS  2,599,170
TOOL SUPPORT
Filed Sept. 15, 1949  2 SHEETS—SHEET 2
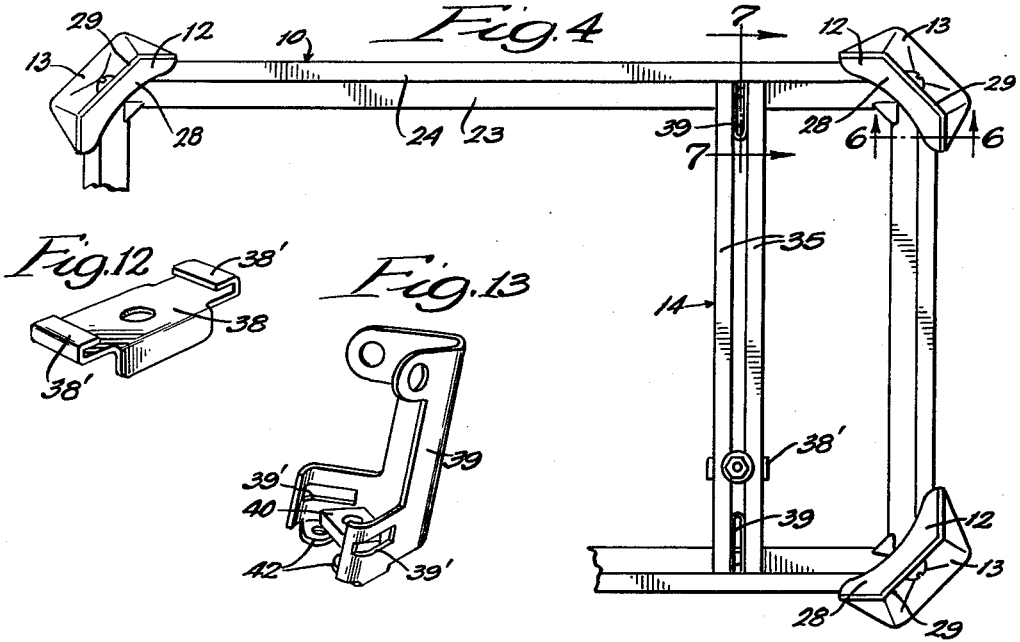
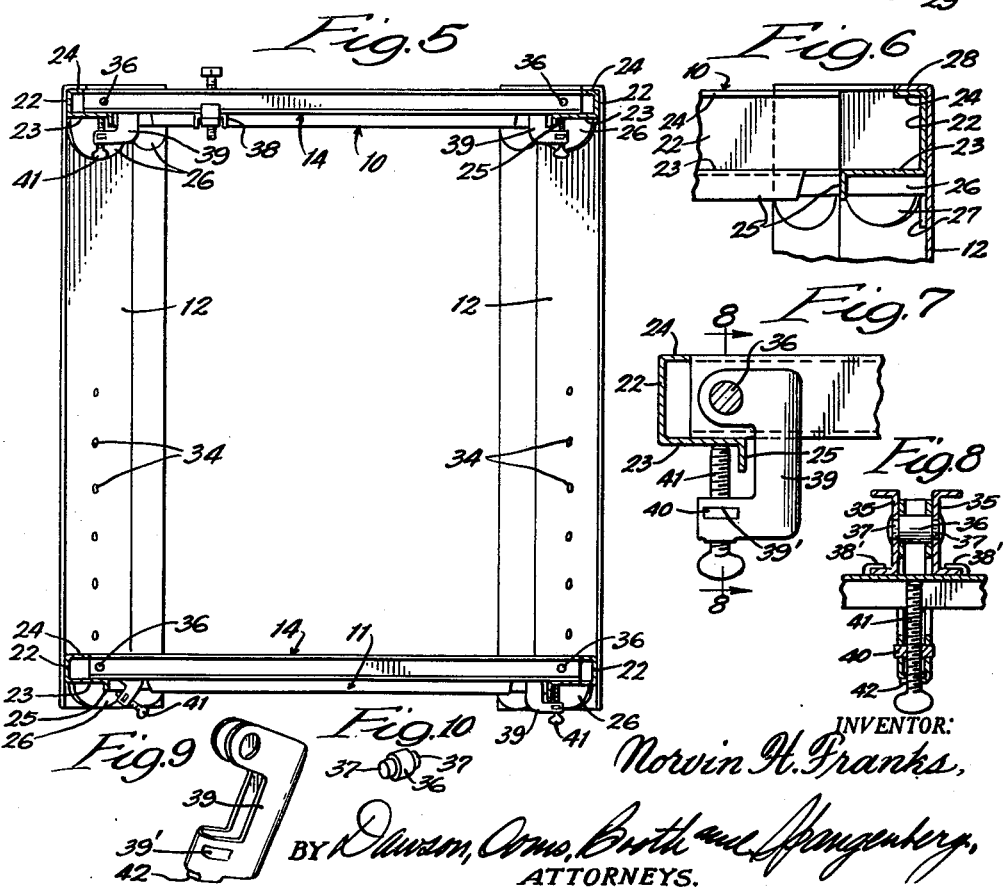
INVENTOR:
Norvin H. Franks,
BY Dawson, Ooms, Booth and Spangenberg,
ATTORNEYS.

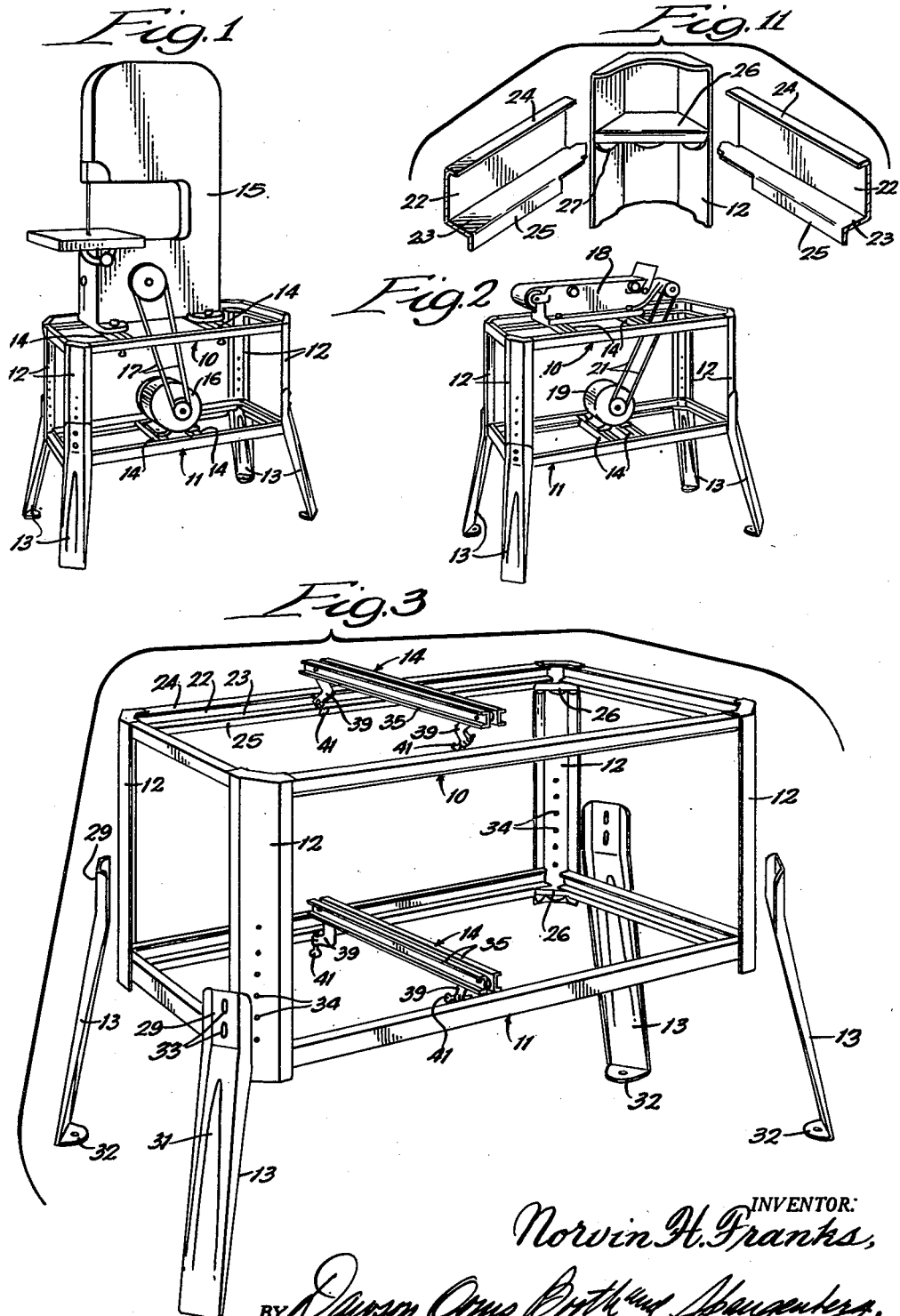

Patented June 3, 1952

2,599,170

UNITED STATES PATENT OFFICE 2,599,170

TOOL SUPPORT

Norvin H. Franks, Chicago, Ill., assignor to Sturdi-Bilt Steel Products, Inc., Chicago, Ill., a corporation of Illinois Application September 15, 1949, Serial No. 115,815

4 Claims. (Cl. 248—23)

This invention relates to tool supports and more particularly to supports for mounting power tools of various types.

Heretofore it has been the usual practice to provide supports individually designed to fit each particular tool or particular type of tool. This practice is satisfactory for large expensive tools as used in production operations but it is highly desirable for smaller tools, such as those of the type used in home workshops, to have a universal support for mounting all of the various tools and their drive motors.

It is accordingly one of the objects of the present invention to provide a tool support which achieves the maximum flexibility of tool mounting to receive and support substantially any desired type of power tool. For this purpose the support is extremely flexible of adjustment to provide varying height and varying spacing of the tool and motor mounting members.

Another object of the invention is to provide a tool support in which the supporting legs are adjustably connected to the frame to vary the height of the frame.

Still another object is to provide a support in which the tools and motors are mounted on supporting bars, slidable on the frame, to accommodate different sized tool and motor bases and to vary the spacing between the motor and tool. According to one feature the supporting bars are slotted to mount the tool or motor and carry clamps engaging the frame flanges to secure them to the frame.

A further object is to provide a supporting bar for a tool support which is formed by spaced beams to leave an elongated mounting slot between them and which carries clamping members at its ends to secure the bar to a frame.

A still further object is to provide a tool support in which all of the parts are formed of sheet metal or of standard structural shapes so that it is easy and inexpensive to manufacture and in which the parts can easily be assembled and disassembled, to be shipped knocked-down and to enable adjustments for different types of tools.

The above and other objects and advantages of the invention will be more readily apparent when read in connection with the accompanying drawings, in which—

Figures 1 and 2 are perspective views showing tool supports embodying the present invention used in connection with different types of tools;

Figure 3 is a disassembled view of a tool support embodying the invention;

Figure 4 is a partial top plan view;

Figure 5 is a transverse section;

Figures 6 and 7 are enlarged detailed sections on the lines 6—6 and 7—7 respectively of Figure 4;

Figure 8 is a section on the line 8—8 of Figure 7;

Figures 9 and 10 are perspective views of structural elements;

Figure 11 is a partial perspective showing the frame corner assembly; and

Figures 12 and 13 are perspective views of structural elements.

As shown in Figures 1 and 2, the support of the present invention comprises a pair of rectangular frames, indicated generally at 10 and 11, connected in spaced-apart, parallel relationship by corner posts 12. The corner posts are secured detachably to legs 13, preferably by means of an adjustable connection through which the height of the frame top can be varied. Each of the rectangular frames carries a pair of supporting bars 14 which are also preferably adjustable on the frames to receive and support a tool and a drive motor.

As shown in Figure 1, the support is utilized to carry a conventional band saw 15, whose base rests on the supporting bars 14 on the top frame. The band saw is driven by a motor 16 mounted on the supporting bars on the lower frame and connected to the saw by a belt 17. It will be seen that this type of tool is relatively high so that the supporting frame should be relatively low and that the tool has a wide base so that the supporting bars must be spaced widely apart.

Fig. 2 illustrates the support mounting a sander 18, which is a relatively flat and small tool so that the support should be elevated to a greater height to bring the sanding surface to a comfortable working level. In this case the supporting bars 14 on which the motor 19 is mounted are so positioned that the motor may be connected to the sander by a suitable belt 21.

While two types of tools have been shown it will be understood that any desired type of tool could be mounted in much the same manner and that the motor can be mounted as required to obtain the necessary spacing between the motor and the drive pulley of the tool.

Each of the frames 10 and 11 is made up of four angle strips permanently connected together. Each strip is of L-section with right angle webs 22 and 23. At the edge of each web there is a short flange, the flange 24 at the edge of the web 22 turning inward parallel to the web 23 and the flange 25 at the edge of the web 23 turning outward. The strips are arranged with the webs 23 at the bottom and the flanges 25 projecting downward so that the webs 22 and 23 and the flange 24 form a horizontal, inwardly opening channel.

The strips are connected at the corners, as best seen in Fig. 11, by corner fittings indicated generally at 26, which are formed of sheet metal to fit against the lower surfaces of the webs 23 and to be welded thereto, the flanges 25 being cut away at the ends of the strips so that the webs 23 can fit against the corner fittings. The fittings 26 are provided with a scalloped flange 27 to interfit with and be connected by welding or the like to the corner posts 12 which are generally channel-shaped with the sides of the channels lying at an obtuse angle to each other. As seen in Fig. 6, the corner posts extend up over the top of the frame strips and are bent inward as shown at 28. The several parts may be connected by welding where they overlap each other to provide an exceedingly strong, permanently assembled structure.

The legs 13 are preferably also formed of sheet metal of substantially the same section as the corner posts 12 and have upper fastening portions 29 to fit against the corner posts. Leg portions 31 extend downward and outward from the fastening portions 29 and terminate in feet 32 which rest on and may be secured to the floor.

For connecting the legs to the corner posts each fastening portion 29 is formed with a pair of elongated bolt holes 33 and each of the corner posts is formed with a series of bolt holes 34 spaced apart the same distance as the bolt holes 33, and preferably extending throughout at least half the length of the corner post. With this construction it will be seen that the bolt holes 33 can be brought into register with any desired pair of bolt holes 34 and the parts can be secured by conventional bolts. The elongated holes 33 enable slight individual adjustment of the legs. In this way it is possible easily to adjust the height of the frame and by inverting the frame from the position shown in Fig. 3 so that the bolt holes 34 are at the upper portion of the corner posts, the frame can be dropped to an extremely low level. As shown in Fig. 1, the legs are bolted to the central pair of bolt holes 34 while in Fig. 2 they are bolted to the bottom pair of bolt holes, thereby elevating the frame as compared to the position shown in Fig. 1.

The supporting bars 14 are formed of a pair of beams, shown as channel beams 35, connected in spaced parallel relation to leave a slot between them to receive mounting bolts or fastenings. For connecting the beams 35, fittings 36, as best seen in Fig. 10, are provided each of which has an enlarged body portion with circular projections 37 at its opposite sides. The projections 37 may extend through bored openings in the webs of the beams 35 and may be peened or swedged over to secure the parts permanently together.

In assembling the bars 14 on the frame, the bars fit against the webs 23 with their upper surfaces flush with the flanges 24 of the frame strips, as best seen in Figure 7. When so fitted they can slide back and forth along the frame to any desired position to accommodate tool or motor bases of different sizes and to position the tool or motor at the desired point on the frame. The tools or motors may be secured to the bars by conventional mounting bolts extending through the tool or motor bases and through the slots between the beams 35 at any desired positions along the lengths of the slots. The bolts may thread into nuts carried between downwardly turned flanges on fittings 38 shown in Figure 12 which span the beams 35 and have flanges 38' slidably to fit over the flanges on the beams 35. In addition, a table top may be secured over the frame resting on the flanges 24 and the bars 14 for use as a table or bench.

To secure the bars in place, clamps are provided at the ends thereof to engage the adjacent frame strips. The clamps, as shown, are formed by C-shaped clamp plates 39, as best seen in Figure 9, which are formed of a folded piece of sheetmetal. At their upper ends the sides of the clamp are formed with openings to pivot on the fittings 36 and at their lower ends have openings 39' to receive nuts 40 into which wing bolts 41 may be threaded. Flanges 42 may be provided at the lower edges of the clamp having registering openings through which the bolt 41 extends to prevent the sides of the clamp from spreading.

In use, when the bars are assembled on the frames, the bolt 41 is loosened to swing under the flange 25 on the frame strips as best seen in Figure 7. When the bolt 41 is tightened the bar 14 will be drawn tightly against the flange 23 to hold the bar securely in place. With this construction the bars can easily be adjusted to any required position and once adjusted can be securely held simply by tightening the bolts 41. When the parts are all assembled, as described, an extremely sturdy support is provided which will hold relatively heavy and powerful tools rigid and yet which is inexpensive to manufacture and is light in weight.

For shipment the legs and supporting bars may be removed from the frame and may be received in the interior of the frame in a relatively small package. When unpacked, the parts can be assembled easily and quickly and can easily be disassembled for further moving or for required adjustments.

While one embodiment of the invention has been shown and described in detail herein, it will be understood that this is illustrative only and is not to be taken as a definition of the scope of the invention, reference being had for this purpose to the appended claims.

What is claimed is:

1. A tool support comprising a rectangular frame formed of channel shaped strips arranged with the open sides of the channels facing inward, supporting bars having their ends fitted slidably in the channel shaped strips and extended across the frame, and clamps carried by the bars adjacent their ends to engage the strips and secure the bars thereto, each of the clamps comprising a C-shaped plate pivotally connected to the bar and a bolt carried by the plate in engagement with the flange of the channel to grip it against the bar.

2. In a tool support, a frame having a pair of spaced parallel flanged strips, supporting bars extended between the strips with their ends fitted against the strip flanges, the supporting bars having elongated slots therein to receive tool fastenings, and adjustable clamps carried by the ends of the bars to grip the sides of the flanges opposite to those against which the ends of the bars fit and secure the bars frictionally to the strips each of said clamps including a curved clamp body connected at one end to a supporting bar with its other end extended around the adjacent flange on a frame strip, and a bolt threadedly carried by the other end of the clamp body in engagement with the flange.

3. In a tool support, a frame having a pair of spaced parallel flanged strips, supporting bars extended between the strips with their ends fitted against the strip flanges, each of the supporting bars being formed by a pair of beams connected in spaced parallel relation, a curved clamp frame pivoted at one end thereof adjacent each end of the supporting bars between the beams with its other end extended around the adjacent flange on a frame strip and a bolt carried by said other end of each clamp frame and in engagement with the associated strip to clamp the bar to the strip flange.

4. In a tool support, a supporting bar comprising an elongated beam member formed with a longitudinally extending slot, a C-shaped clamp frame formed of sheet metal with two C-shaped sides and folded upon itself along a straight line at the junction of said sides, means pivoting the clamp frame at one end on a transverse axis adjacent to one end of the beam member, the sides adjacent to the other end of the clamp frame being formed with openings therein, a threaded nut fitted in the openings, bent over lugs on the sides of the clamp frame overlapping each other and having openings therein aligned with the opening in the nut, and a threaded bolt extended through the openings in the lugs and threaded through the nut for movement toward and away from said end of the beam member.

NORVIN H. FRANKS.

REFERENCES CITED

The following references are of record in the file of this patent:

UNITED STATES PATENTS

| Number | Name | Date |
|---|---|---|
| 585,231 | Schaffer | June 29, 1897 |
| 1,214,584 | Pfeffer | Feb. 6, 1917 |
| 1,424,190 | Cole et al. | Aug. 1, 1922 |
| 1,481,137 | Lemke et al. | Jan. 15, 1924 |
| 1,561,576 | Tiffany | Nov. 17, 1925 |
| 1,707,203 | Thornley | Mar. 26, 1929 |
| 1,794,976 | Mueller | Mar. 3, 1931 |
| 1,813,045 | Franks | July 7, 1931 |
| 2,036,113 | Befera | Mar. 31, 1936 |

FOREIGN PATENTS

| Number | Country | Date |
|---|---|---|
| 43,067 | Denmark | Sept. 22, 1930 |